United States Patent [19]

Shibata et al.

[11] Patent Number: 5,182,667
[45] Date of Patent: Jan. 26, 1993

[54] METHOD OF RECEIVING WAVELENGTH MULTIPLEX SIGNALS

[75] Inventors: Akiji Shibata; Nobuo Ando, both of Hitachi, Japan

[73] Assignee: Hitachi Cable Limited, Tokyo, Japan

[21] Appl. No.: 701,549

[22] Filed: May 16, 1991

[30] Foreign Application Priority Data

May 18, 1990 [JP] Japan .................................. 2-129949

[51] Int. Cl.⁵ ............................................ H04J 14/02
[52] U.S. Cl. ...................................... 359/124; 359/189
[58] Field of Search ............... 359/124, 125, 129, 130, 359/133, 110, 114, 118, 123, 189

[56] References Cited

U.S. PATENT DOCUMENTS 4,773,063 9/1988 Hunsperger et al. ............... 359/130
4,932,742 6/1990 Tohme ................................. 359/124

Primary Examiner—Edward L. Coles, Sr.
Assistant Examiner—Kinfe-Michael Negash
Attorney, Agent, or Firm—Dykema Gossett

[57] ABSTRACT

A method of receiving wavelength multiplex signals is designed to receive together, at an end of an optical fiber transmission path, optical information signals transmitted in multiple wavelengths, which correspond to multiple kinds of information, from a plurality of information sources distributed at a virtually constant interval along the transmission path in response to an optical trigger signal. Each of the optical information signals is sampled at a time interval that is in inverse proportion to the light velocity which depends on the wavelength of the signal, so that the content, kind and source of information are identified at the signal reception.

8 Claims, 1 Drawing Sheet

METHOD OF RECEIVING WAVELENGTH MULTIPLEX SIGNALS

BACKGROUND OF THE INVENTION

The present invention relates to a method of receiving wavelength multiplex signals, and particularly to a method of receiving wavelength multiplex signals transmitted from a plurality of signal sources.

In centralized remote monitoring for such industrial facilities as overhead power lines laid out over a long distance or wide area, various information is collected in many places and transmitted through optical fiber cables. In this case, the total quantity of information is assessed as a product of the number of kinds of information and the number of places. Although each piece of information is not complex, the total quantity of information is enormous, and their transmission and reception must be conducted efficiently. For example, when it is intended to assess the functional status of a power line at each moment of time in terms of a 10-step index, the status of each point is converted into one of ten light intensities, the optical signal is transmitted through an optical fiber cable, and it is received at a transformer station. If there are five types of fault indicated by five pieces of information collected at each of 100 power line towers, it is necessary to transmit 500 pieces of information separately, virtually simultaneously, and uninterruptedly.

One prevalent method of transmitting numerous signals efficiently through an optical fiber cable is the wavelength multiplexing optical signal transmission system, in which lights of different wavelengths are used to transmit different kinds of information simultaneously and the optical signals received by the receiving station are separated by means of wavelength filters. In the case of a single information source, signals are readily separated based on wavelength, whereas in the case of multiple information sources on power line towers along an optical fiber cable, identification of each information source is required in addition to the wavelength separation.

Methods of information source identification include: (1) Transmission of signals, with information source codes appended thereto, (2) Time-based signal transmission conducted at a predetermined time point for each information source, or sequential signal transmission based on a predetermined interval and sequence of transmission among information sources along the cable. Any of these methods allow for redundancy in sending the positional information.

Another method, which is intended to enhance the transmission efficiency or for the case where the quantity of information is too large to take control of location identification or appendage of location code, is that the receiving station sends a trigger signal accompanied by certain information and an information source responds to the trigger signal to send back information. This scheme is designed such that the receiving station sends a trigger signal, the signal reaches the nearest information source A, the source A transmits information signals in multiple wavelengths, and the receiving station completes the reception of the signals of source A before signals of a farther information source B come to the position of the source A following the arrival of the trigger signal at the source B. The receiving station receives information signals sequentially from the nearest source and then from the next nearest source and so on, and it can separate signals of each information source based on the wavelength.

Although the above-mentioned sequential reception of information signals from many places by using the trigger signal provides an efficient signal transmission path through the optimal setting of the timing condition for the trigger signal and information signals, it involves a problem of increased complexity of process for the received signals. The problem is mainly attributable to the fact that the velocity of light in the optical fiber cable is dependent on the wavelength of the light. Supposing the transmission of information $\alpha_i$ and $\beta_i$ from an information source with a distance of $L_i$ from the receiving station at a time point $t_o$ of the arrival of trigger signal by choosing wavelengths $\lambda_\alpha$ and $\lambda_\beta$ having velocities $V_\alpha$ and $V_\beta$, respectively, (where $V_\alpha > V_\beta$) in the optical fiber cable, the receiving station will receive these information at time points $$t_{\alpha i} = t_o + t_c + L_i/V_\alpha \text{ and } t_{\beta i} = t_o + L_i/V_\beta \text{ respectively.}$$

The term $t_c$ is a time length expended by an information source before it transmits the information signal after receiving the trigger signal, and this time length may be zero in some cases.

FIG. 2 shows, on the horizontal time axis, information signals of the kinds $\alpha$ and $\beta$ received in correspondence to the distances $L_1, L_2, \ldots, L_m$ at a virtually equal interval. The $\alpha$-type information signals with a high velocity are received earlier than the $\beta$-type information signals. On this account, when signals are sampled at a time point $t_p$, the picked-up signals $S_\alpha(t_p)$ and $S_\beta(t_p)$ are information of kinds $\alpha$ and $\beta$ from the locations with distances $L_j$ and $L_i$, i.e., these information signals are not of a same location. The greater the distance of an information source from the receiving station, the larger is the error in the information signal received from it. Accordingly, it is necessary to rearrange information signals sampled at a time point $t_p$ in consideration of error thereby to group information signals from each information source.

Accordingly, this method of efficient use of the optical fiber information transmission path necessitates the signal rearrangement process, and it suffers degraded efficiency as the whole reception system. Particularly, for the purpose of collecting information from many places distributed at a small interval along an optical fiber cable, it will become a very inefficient method of information collection to sample data at a constant time interval and thereafter rearrange numerous data so as to group data of individual information sources for the assessment of the functional status of each place. Moreover, in the example of FIG. 2, sampling at a time point $t_q$ provides data of kind $\alpha$ from one information source, but this time point is a gap section of reception of data of kind $\beta$ between two information sources, resulting in the deficiency of data reception or the erroneous identification of information source.

SUMMARY OF THE INVENTION

The present invention is intended to overcome the foregoing prior art deficiencies, and its prime object is to provide a method of receiving efficiently information of many kinds transmitted in multiple wavelengths from many locations along an optical fiber cable.

According to one aspect of this invention, a method of receiving wavelength multiplex signals is designed to receive together, at an end of an optical fiber transmission path, optical information signals transmitted in multiple wavelengths, which correspond to multiple kinds of information, from a plurality of information sources distributed at a virtually constant interval along the transmission path in response to an optical trigger signal, wherein each of the optical information signals is sampled at a time interval that is in inverse proportion to the light velocity which depends on the wavelength of the signal, so that the content, kind and source of information are identified at the signal reception.

According to another aspect of this invention, a method of receiving wavelength multiplex signals is designed to receive together, with a receiving apparatus at an end of an optical fiber transmission path, optical information signals transmitted in multiple wavelengths, which correspond to multiple kinds of information, from a plurality of information sources distributed at a virtually constant interval along the transmission path in response to an optical trigger signal sent from the end of transmission path, wherein the optical information signals arriving at the end of transmission path are separated based on the wavelength and each of the optical information signals is sampled at a time interval that is in inverse proportion to the light velocity which depends on the wavelength of the signal, so that the content, kind and source of information are identified at the signal reception.

DESCRIPTION OF THE PREFERRED EMBODIMENTS

Figure 1:
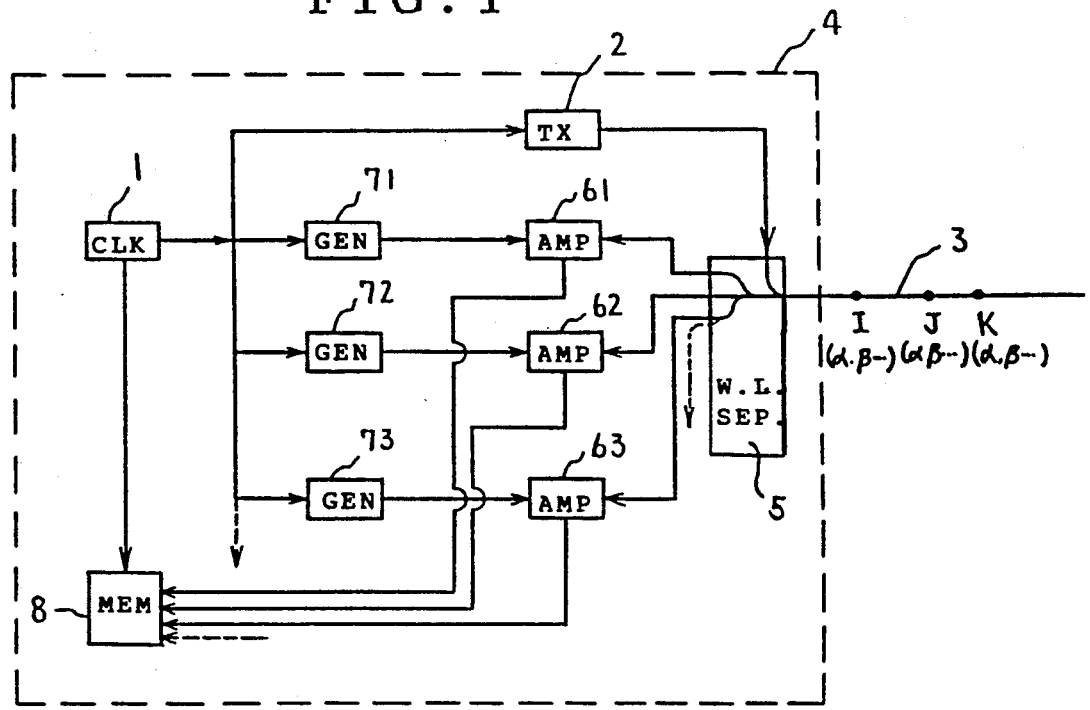
FIG. 1 is a block diagram used to explain the method of receiving wavelength multiplex signals based on the present invention.
Figure 2:
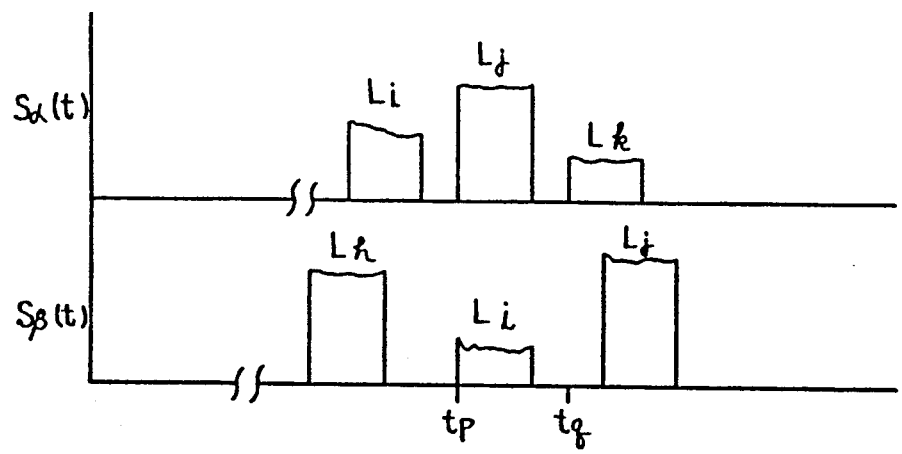
FIG. 2 is a diagram used to explain an example of signal waveforms received by the conventional multiple wavelength signal reception method.

An embodiment of this invention will be described with reference to FIG. 1. At a prescribed interval timed by a clock generator 1, a transmitter 2 sends a trigger signal over an optical fiber cable 3. A plurality of information source I, J, K and so on located along the optical fiber cable 3 transmit information $\alpha$, $\beta$ and so on of multiple kinds to a receiving station 4 in response to the arrival of the trigger signal. Received optical signals are separated based on the wavelength by a wavelength separator 5, and the separated optical signals are converted into electrical signals by transducing amplifiers 61, 62, 63 and so on provided in correspondence to the wavelengths.

The clock generator 1 operates on sampling time signal generators 71, 72, 73 and so on equal in number to the wavelengths to produce timing signals corresponding to the wavelengths. The outputs of the transducing amplifiers 61, 62, 63 and so on are read in response to the corresponding timing signals and delivered to the next stage, i.e., a memory 8 in this embodiment.

The sampling time is determined as follows. For the distance D between adjacent information sources, the propagation light velocity $V_t$ of the trigger signal, and the propagation light velocity $V_s$ of one information signal, a base time is calculated as $T = D/V_t + D/V_s$. The base time T divided by an integer is assigned to be the sampling interval for a specific wavelength. The integer is common to all wavelengths. For example, a trigger signal wave, $\alpha$ wave, $\beta$ wave and $\gamma$ wave having light velocities of 202, 200, 195 and 190 m/$\mu$s in the optical fiber cable are used to collect three kinds of information at locations of 5-meter interval along the optical fiber cable. The receiver sends a light pulse of trigger signal over the optical fiber cable, and on expiration of a prescribed time $\gamma$ it samples signals at an interval of $5/202(V_t) + 5/200(V_s) = 0.049752$ $\mu$s for the $\alpha$ wave, an interval of $5/202 + 5/195 = 0.050394$ $\mu$s for the $\beta$ wave, and an interval of $5/202 + 5/190 = 0.051068$ $\mu$s for the $\gamma$ wave. Consequently, three kinds of information collected at the same location at the same time can be received. In the case of sampling two kinds of information at each location, the sampling period is halved.

In such sequential reception signals, the Nth signals of $\alpha$ wave, $\beta$ wave and $\gamma$ wave are by themselves the signals of the same location with a distance of 5N meters from the receiver, instead of having to be rendered a rearrangement process or the like for the information source locations based on the sampling time as in the conventional manner, and this enables a very simple process to replace information with other information at a place. The prescribed expiration time is mainly required for the time lag of data transmission following the reception of the trigger signal at each location, and this time can be eliminated when information is carried by a reflected light or scattered light which responds instantaneously to the trigger light pulse, for example. This embodiment affords a time of at least about 50 ns for receiving the signal from the next nearest place, and if transmission of information immediately after the arrival of trigger signal is not required, information transmission can further be ensured by setting the duration of transmission appropriately within 50 ns and setting the expiration time to a half time width, e.g., 25 ns.

Even in case the interval of information sources is not exactly constant, information collection is still possible through proper setting of the expiration time and transmission duration.

The present invention is applicable not only to the foregoing case of information sources each having a driver for converting an electrical signal of certain information into an optical signal of a certain wavelength in response to the reception of a trigger signal, but also to the case of an information signal in the form of a scattered, transmitted or reflected light produced by optical fiber or optical component parts in response to a trigger signal.

As described above, the present invention enables a minimal optical fiber transmission path to receive a great deal of information in multiple wavelengths from many places, and the invention offers an economical method of receiving a large volume of information sent over an optical fiber cable.

We claim:
1. A method of receiving wavelength multiplexed optical signals at the end of an optical fiber transmission path, wherein said multiplexed signals are transmitted in response to an optical trigger signal and represent multiple kinds of information respectively from a plurality of information sources distributed along said transmission path at essentially constant intervals, comprising the step of:

sampling said wavelength multiplexed optical signals respectively at time intervals inversely proportional to the light propagation velocities of said multiplexed signals, whereby the content, kind and source of information of each of said multiplexed signals may be identified at the end of said transmission path.

2. A signal receiving method according to claim 1, wherein said sampling interval of each information signal is determined from a base time T which is calculated for a distance D between adjacent information sources, a propagation velocity $V_t$ of the optical trigger signal and a propagation velocity $V_s$ of the optical information signal, as: $T = D/V_c + D/V_s$.

3. A signal receiving method according to claim 2, wherein said sampling interval of each information signal is determined by dividing said base time T by an integer, said integer being common to all information signals of multiple wavelengths.

4. A signal receiving method according to claim 1, wherein said sampling of said optical signals commences on expiration of a prescribed time length which is necessary for each information source to transmit an optical signal following the transmission of said optical trigger signal from said end of transmission path.

5. A signal receiving method according to claim 1, wherein each of said information signal sources includes a driving device which converts an electrical signal carrying information into an optical signal having a certain wavelength and transmits said optical signal.

6. A signal receiving method according to claim 1, wherein said optical signal transmitted by each of said information sources is a scattered, transmitted or reflected light produced by optical fiber or optical component parts in response to said optical trigger signal sent from said end of transmission path.

7. A signal receiving method according to claim 1, wherein each of said information sources includes a driving device which converts information indicative of the functional status of a power line at each moment of time into an optical signal having a certain wavelength and transmits said optical signal.

8. A signal receiving method according to claim 1, wherein said optical trigger signal sent from said end of transmission path is modulated.

* * * * *